United States Patent

Berg et al.

[11] Patent Number: 5,580,081
[45] Date of Patent: Dec. 3, 1996

[54] DASHBOARD HAVING AN INTEGRAL AIR BAG DISCHARGE CHANNEL

[75] Inventors: Matthias Berg, Kempen; Hartmut Harnisch, Grefrath; Steven Madge, Krefeld; Werner Reinhardt, Rüsselsheim, all of Germany

[73] Assignee: Deutsche Fibrit Gesellschaft Ebers & Dr. Muller mbH, Grefrath, Germany

[21] Appl. No.: 443,902

[22] Filed: May 17, 1995

[30] Foreign Application Priority Data

Jun. 22, 1994 [DE] Germany ............ 44 21 820.6

[51] Int. Cl.$^6$ ............ B60R 21/20; B60R 21/22; B60K 37/04
[52] U.S. Cl. ............ 280/728.3; 280/732; 180/90
[58] Field of Search ............ 280/732, 728.2, 280/728.3, 728.1, 730.1, 752; 296/70, 72; 180/90

[56] References Cited

U.S. PATENT DOCUMENTS

| | | | |
|---|---|---|---|
| 3,887,214 | 6/1975 | Brawn | 280/730.1 |
| 5,096,221 | 3/1992 | Combs et al. | 280/732 |
| 5,282,647 | 2/1994 | Barnes | 280/732 |
| 5,292,151 | 3/1994 | Parker | 280/728.3 |
| 5,295,708 | 3/1994 | Siga et al. | 280/732 |
| 5,301,966 | 4/1994 | Sakata | 280/732 |
| 5,306,043 | 4/1994 | Mihm et al. | 280/732 |
| 5,316,335 | 5/1994 | Gray et al. | 280/732 |
| 5,320,381 | 6/1994 | Barnes et al. | 280/732 |
| 5,332,257 | 7/1994 | Rogers et al. | 280/732 |
| 5,421,608 | 6/1995 | Parker et al. | 280/732 |
| 5,427,409 | 6/1995 | Henseler et al. | 280/728.3 |
| 5,441,299 | 8/1995 | Lauritzen et al. | 280/732 |
| 5,478,106 | 12/1995 | Bauer et al. | 280/732 |

FOREIGN PATENT DOCUMENTS

| | | | |
|---|---|---|---|
| 0364714 | 4/1990 | European Pat. Off. | |
| 618110 | 10/1994 | European Pat. Off. | 280/732 |
| 3611486 | 10/1987 | Germany. | |
| 4220704A1 | 1/1993 | Germany. | |
| 4236131A1 | 7/1993 | Germany. | |
| 4306465A1 | 9/1993 | Germany. | |
| 4217173A1 | 11/1993 | Germany. | |
| 4311241C1 | 4/1994 | Germany. | |
| 4-191140 | 7/1992 | Japan | 280/728.3 |
| 4-356250 | 12/1992 | Japan. | |
| 5-270342 | 10/1993 | Japan. | |
| 5-270340 | 10/1993 | Japan | 280/732 |
| 6-127326 | 5/1994 | Japan | 280/728.3 |

*Primary Examiner*—Brian L. Johnson
*Assistant Examiner*—Peter C. English
*Attorney, Agent, or Firm*—Meltzer, Lippe, Goldstein, et al.

[57] ABSTRACT

A motor vehicle dashboard has a cutaway portion on the passenger's side, into which a hinged flap is inserted. Connected to the underside of the dashboard is a reinforcing half-shell with a discharge channel for an air bag. The characterizing feature of the invention is that the discharge channel forms an integral structural component with the reinforcing half-shell.

2 Claims, 1 Drawing Sheet

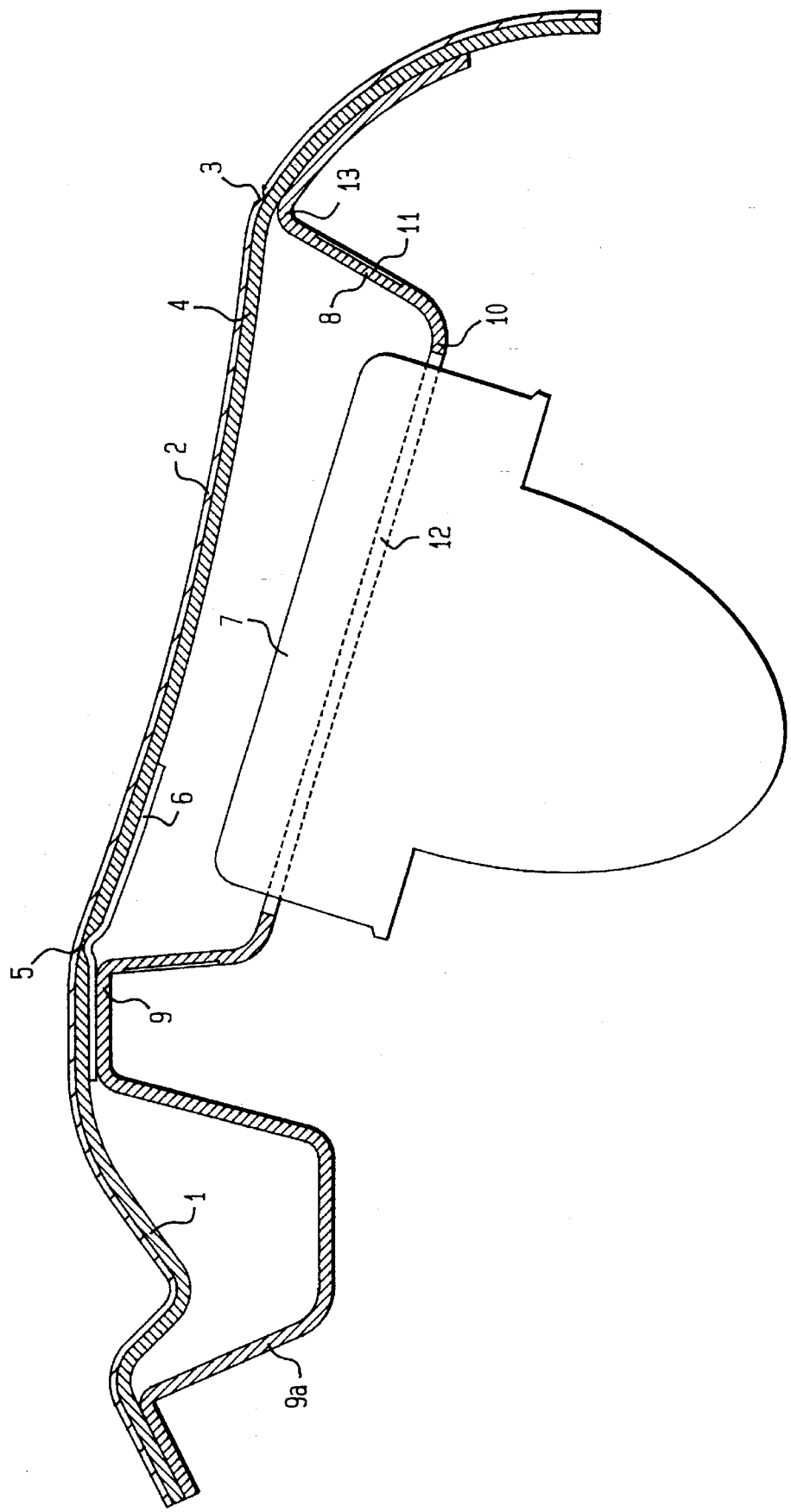

DASHBOARD HAVING AN INTEGRAL AIR BAG DISCHARGE CHANNEL

BACKGROUND OF THE INVENTION

1. Field of the Invention

The invention relates to a motor vehicle dashboard. More particularly, the invention relates to a dashboard incorporating an air bag on the passenger's side, with a reinforcing half-shell containing an integral discharge channel for the air bag.

DESCRIPTION OF THE PRIOR ART

As a rule the dashboard consists of a foil-lined support. The lining material can be plastic or leather. The material used for the support can be either plastic or defibrated wood fibres to which plastic has possibly been added. The dashboard also comprises a reinforcing half-shell which is disposed below the support and is connected thereto and which can also be formed with the aeration channel.

Hitherto the dashboard support has been formed with a recess through which the airbag emerges in a collision, to protect the passenger of a motor vehicle. The recess was closed by a flap attached via a hinge to the dashboard support at the edge of the recess. The flap was covered by the lining of the dashboard with a plastic foil coated with cellular material. The known method had the disadvantage that the flap had to be produced and assembled as an additional member, something which was costly in labour and money and added a good deal of weight.

To obviate this disadvantage, a flap has already been produced as an integral component of the dashboard support, but this has hitherto been successful only with a construction having a layer of cellular material under the foil.

According to a more recent proposal, the joint separating the flap over a portion of its periphery from the support should be narrower than 0.8 mm, the foil being weakened in the zone of the joint. As a result, the joint can be covered smoothly with the lining between the recess in the support and in the flap.

Furthermore, the discharge channel for the airbag is mounted as a separate constructional component below the dashboard in the zone beneath the aforementioned flap. Additional reinforcing, usually metal sections for the discharge channel are also screwed on under the dashboard. Manufacture and assembly of the discharge channel for the airbag are expensive.

It is an object of the invention to provide a simpler, cheaper and lighter construction of the airbag discharge channel which requires less labour for assembly.

SUMMARY OF THE INVENTION

To solve this problem, in a dashboard of the kind specified according to the invention the discharge channel is formed in the reinforcing half-shell, which forms a shoulder for supporting the flap and a stability-enhancing bent collar at the passage opening for the airbag. Unlike previously, the discharge channel is not made from heavy sheet metal, but from the same lighter material, plastic or defibrated wood fibres, as the reinforcing half-shell. The result is the preferred possibility of joining and connecting, for instance, gluing the constructional member to the dashboard support.

The stability-enhancing bent collar at the passage opening for the airbag in the discharge channel can be bent at an angle inwardly or outwardly.

The discharge channel can have the same wall thickness as that of the reinforcing half-shell. However, in some circumstances a reinforcement may be necessary. In that case a material can be thickened in the more heavily stressed zone or reinforcement can take the form of an inserted or folded-over cuff, more particularly of a tear-resistant material, such as a fabric.

The solution according to the invention provides the following advantages:

- the integral forming of the discharge channel on the reinforcing half-shell eliminates the separate production and handling of the discharge channel;
- the assembly of the reinforcing half-shell with the integral discharge channel below the dashboard is appreciably simplified and accelerated;
- the weight of the motor vehicle is reduced by the elimination of the metal reinforcement and the use of a lighter material;
- the previous problems of assembling the discharge channel are eliminated;
- the discharge channel can be recycled together with the dashboard—i.e., for disposal purposes demounting is no longer required to separate the metallic parts from the nonmetallic parts;
- there is less risk that the airbag will be damaged during its release, since the hitherto separately attached metallic parts are eliminated;
- the risk of injury caused by sharp-edged metallic parts during assembly is eliminated.

BRIEF DESCRIPTION OF THE DRAWINGS

The single view is a cross-section of the inventive dashboard.

DESCRIPTION OF THE PREFERRED EMBODIMENT

The dashboard comprises a support 1 whose visible top side is lined with a foil 2. The support 1 is formed with a recess 3 into which a flap 4 is fitted. The flap 4 is attached hinge-fashion to the support 1 at a place 5. The hinge can be formed by a strip of fabric 6 attached below the support 1. The foil 2 also covers the flap 4. When an airbag 7 disposed below the dashboard is released, the flap 4 opens and enables the airbag to emerge through the recess 3 in the support 1 to protect the passenger. At the same time the foil 2 tears in the zone of the joint between the flap 4 and the edge of the recess 3.

A discharge channel 8 is provided below the dashboard to guide the airbag 7.

Channel 8 is slightly conical in shape and is unitary with a reinforcing half-shell 9, which is also unitary with an aeration channel 9a, and is attached to the underside of the dashboard.

The shape of the constructional member (8, 9), formed by discharge channel 8 and reinforcing half-shell 9, is adapted to the shape of the dashboard and joined thereto, illustratively, by gluing.

The discharge channel 8 forms a shoulder 13 against which the flap 4 bears via its edge. To enhance stability, a bent collar 10 is provided at the passage opening 12 at the inner end of the discharge channel 8. The collar 10 is shown bent at an angle inwardly, but it can also be bent at an angle outwardly.

The stability of the discharge channel 8 can be further enhanced by a ring 11 of tear-resistant material which is pressed into the discharge channel 8 as a reinforcing cuff therearound. Instead of this, the ring 11 might also be glued on to the discharge channel 8.

We claim:

1. A dashboard for air bag deployment comprising:

a support member having a cutaway portion for emergence of said air bag on a passenger side, a flap fitted into said cutaway portion, said flap being attached to said support member by a hinge, a constructional member attached to the underside of said support member, said constructional member comprising a reinforcing half-shell and a discharge channel formed in said half-shell, said discharge channel being an integral structural component of said constructional member, said discharge channel including a supporting shoulder against which said flap bears, and a bent collar at a passage opening for said airbag.

2. The dashboard of claim 1 wherein said constructional member is glued to the underside of said support member.

* * * * *